(12) United States Patent
Kohara

(10) Patent No.: US 10,112,445 B2
(45) Date of Patent: Oct. 30, 2018

(54) PNEUMATIC TIRE

(71) Applicant: SUMITOMO RUBBER INDUSTRIES, LTD., Kobe-shi, Hyogo (JP)

(72) Inventor: Kei Kohara, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 244 days.

(21) Appl. No.: 14/785,250

(22) PCT Filed: Mar. 11, 2014

(86) PCT No.: PCT/JP2014/056342
§ 371 (c)(1),
(2) Date: Oct. 16, 2015

(87) PCT Pub. No.: WO2014/181579
PCT Pub. Date: Nov. 13, 2014

(65) Prior Publication Data
US 2016/0082784 A1    Mar. 24, 2016

(30) Foreign Application Priority Data

May 7, 2013  (JP) ................................. 2013-097799

(51) Int. Cl.
*B60C 15/00*    (2006.01)
*B60C 15/04*    (2006.01)
(Continued)

(52) U.S. Cl.
CPC ............ *B60C 15/0018* (2013.01); *B60C 9/02* (2013.01); *B60C 15/05* (2013.01); *B29D 30/48* (2013.01);
(Continued)

(58) Field of Classification Search
CPC .......... B60C 15/00; B60C 15/04; B60C 15/05; B29D 30/48
See application file for complete search history.

(56) References Cited

U.S. PATENT DOCUMENTS 4,628,978 A  *  12/1986  Imai ...................... B60C 9/0042
                                                          152/451
2009/0020202 A1 *  1/2009  Jaunet ................. B29C 47/0021
                                                          152/450
(Continued)

FOREIGN PATENT DOCUMENTS

EP      1088686    *  4/2001
EP      1088686  A2    4/2001
(Continued)

OTHER PUBLICATIONS

Extended European Search Report, dated Nov. 29, 2016, for European Application No. 14794067.0.

*Primary Examiner* — Justin R Fischer
(74) *Attorney, Agent, or Firm* — Birch, Stewart, Kolasch & Birch, LLP

(57) ABSTRACT

Provided is a pneumatic tire which is configured so as to prevent carcass cords from biting into an inner liner, thereby improving the durability performance of the tire. A pneumatic tire (1) is provided with a carcass (6) which comprises, a carcass ply (11) extending from a tread (2) through side walls (3) to the bead cores (5) of bead sections (4), the bead cores (5) each including an inner core (14) and an outer core (15). The carcass, ply (11) is sandwiched between the inner cores (14) and the outer cores (15). Each of an inner core (14) and an outer core (15) includes a bead cord (16) which is wound at least one turn in the circumferential direction of the tire. Each of the bead cords (16) includes an outermost layer (18) formed by twisting filaments (17) together. In at least one bead section, the outermost layer (18) of the bead cord (16) of each of the inner core (14) and the outer core (15) is twisted in the direction which allows the carcass ply (Continued)

(11) to easily move to the outside in the radial direction of the tire from between the inner core (14) and the outer core (15).

5 Claims, 9 Drawing Sheets

(51) Int. Cl.
*B60C 15/05* (2006.01)
*B29D 30/48* (2006.01)
*B60C 9/02* (2006.01)
*B60C 9/00* (2006.01)

(52) U.S. Cl.
CPC ............... *B60C 2009/0071* (2013.01); *B60C 2015/042* (2013.01); *B60C 2015/046* (2013.01)

(56) References Cited

U.S. PATENT DOCUMENTS

| 2012/0193010 A1 | 8/2012 | Fukumoto |
| 2014/0251522 A1 | 9/2014 | Fukumoto |

FOREIGN PATENT DOCUMENTS

| EP | 2910390 A1 | 8/2015 |
| JP | 2008-13135 A | 1/2008 |
| JP | 2008-273435 A | 11/2008 |
| JP | 2012-106441 A | 6/2012 |
| JP | 2012-158064 A | 8/2012 |
| WO | WO 2013/054579 A1 | 4/2013 |

* cited by examiner

PNEUMATIC TIRE

TECHNICAL FIELD

The present invention relates to pneumatic tires, and in particular to a pneumatic tire including a carcass ply having an end interposed between an axially inner core and an axially outer core disposed in a bead portion.

BACKGROUND ART

The following patent document 1 discloses a core-molding method for manufacturing a pneumatic tire using a core. The core includes an outer surface corresponding to an inner surface of the pneumatic tire to be manufactured. In a process to form a green tire, an inner liner, a carcass ply, a bead core, a sidewall rubber, a tread rubber and the like are arranged on the outer surface of the core. Then the green tire with the core is vulcanized in a tire mold so that the green tire is not expanded in the tire mold. After vulcanization, the core is taken out by being decomposed from the vulcanized tire. In the core-molding method, since the deformation of the tire during vulcanization is small, it may provide a pneumatic tire with excellent dimension stability FIG. 9 illustrates a partial cross-sectional view of a bead portion b of a pneumatic tire manufactured through the core-molding method. The pneumatic tire includes a carcass c including a carcass ply c1 that includes a plurality of carcass cords. The bead portion c is provided with a bead core d therein. The bead core d includes an inner core di disposed axially inward of the carcass ply c1 and an outer core do disposed axially outward of the carcass ply c1. The respective inner and outer cores di and do are configured to have a bead cord spirally wound plural times in a circumferential direction of the tire. The end of the carcass ply c1 is held between the inner core di and the outer core do.

CITATION LIST

Patent Literature 1: Japanese Unexamined Patent Application Publication No 2012-158064

SUMMARY OF INVENTION

Technical Problem

As the carcass cord, a material having a heat shrinkable property may be used. Such a carcass cord shrinks by heat during vulcanization. When the carcass cord, which is held between the inner core di and the outer core do, thermally shrinks, the carcass cord may bite into the inner liner f by increasing the tension of the carcass cord. Such a tire, for example, tends to have damage on the inner liner f along the carcass cords, thereby exhibiting undesirable durability.

The present invention has been made in view of the above problem, and has a main object to provide a pneumatic tire having excellent dimension stability and durability.

Solution to Problem

The present invention provides a pneumatic tire comprising a carcass comprising a carcass ply extending between bead cores of bead portions through a tread portion and a pair of side wall portions, each of the bead cores comprising an inner core disposed axially inward of the carcass ply and an outer core disposed axially outward of the carcass ply, wherein the carcass ply is interposed between the inner core and the outer core, each of the outer core and the inner core comprising a bead cord wound at least one time in a circumferential direction of the tire, and the bead cord comprising an outermost layer having a plurality of filaments twisted together, in at least one of the bead portions, each of the outermost layers of the bead cords of the respective inner and outer cores having a twisting direction in which the carcass ply moves easily radially outwardly from between the inner core and the outer core.

In another aspect of the invention, in at least one of the head portions, a winding direction of the bead cord of the inner core in the circumferential direction of the tire may be the same as a winding direction of the head cord of the outer core in the circumferential direction of the tire, and the twisting direction of the outermost layer of the bead cord of the inner core may be opposite to the twisting direction of the outermost layer of the bead cord of the outer core.

In another aspect of the invention, in at least one of the bead portions, a winding direction of the bead cord of the inner core in the circumferential direction of the tire may be opposite to a winding direction of the bead cord of the outer core in the circumferential direction of the tire, and the twisting direction of the outermost layer of the bead cord, of the inner core may be the same as the twisting direction of the outermost layer of the bead cord of the outer core.

In another aspect of the invention, the carcass cord may have a heat shrinkage ratio of not less than 1.5%, where the heat shrinkage ratio is defined as a ratio y/x (%) of an amount of shrinkage "y" of the carcass cord under a no-load condition when left 5 minutes at 180 degrees Celsius to an original length "x" of the carcass cord.

Advantageous Effects of Invention

In the pneumatic tire in accordance with the present invention, at least one of the bead portions includes the inner core and the outer core. The outermost layer of the bead cord of the respective inner and outer cores has a twisting direction in which the carcass ply moves easily radially outwardly from between the inner core and the outer core. Accordingly, when the carcass cord thermally shrinks, the carcass cord may moves radially outwardly from between the inner core and the outer core. Such a-movement may prevent an increase in tension on the carcass cord, thereby preventing the carcass cord from biting into the inner liner. Thus, the pneumatic tire in accordance with the present invention may exhibit excellent durability.

DESCRIPTION OF EMBODIMENTS

Figure 1:
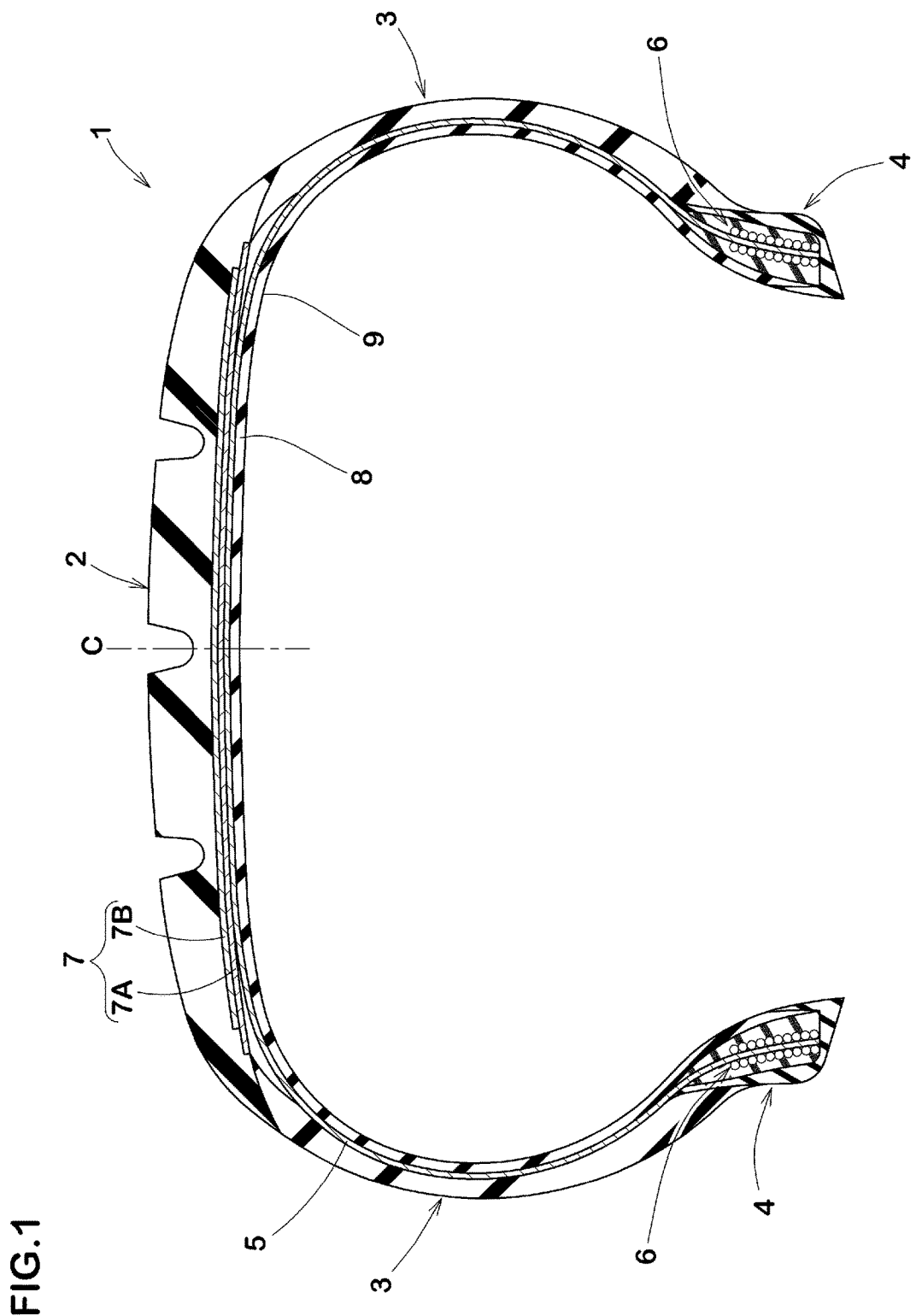
FIG. 1 is a cross-sectional view of a pneumatic tire in accordance with an embodiment of the present invention.

An embodiment of the present invention will be explained below with reference to the accompanying drawings. FIG. 1 illustrates a meridian cross-sectional view of a pneumatic tire (hereinafter, it may be simply referred as "tire") 1 in accordance with the present embodiment.

As shown in FIG. 1, the tire 1 includes a carcass 5 extending between a pair of bead portions 4 and 4 through a tread portion 2 and a pair of sidewall portions 3 and 3, and a bead core 6 disposed in each of the bead portions 4 and 4. In addition, the tire 1 in accordance with the present embodiment includes a belt layer 7 disposed radially outward of the carcass 5, and an inner liner 8 disposed radially inward of the carcass 5. The tire 1 may be embodied as a passenger car tire, for example.

The belt layer 7 includes at least one belt ply of belt cords laid at an angle of from 10 to 40 degrees with respect to the tire equator C. In this embodiment, the belt layer 7 includes two belt plies 7A and 7B which are superposed in a radial direction of the tire so that the belt cords of each ply are crossed. As the belt cord, not only steel cord but also a high modulus organic fiber cord such as aramid rayon and the like may be employed.

The inner liner 8 is arranged approximately the whole area of a tire cavity surface 9 so as to extend between bead portions 4 and 4 in a troidal shape. In order to maintain the inner pressure of the tire 1, the inner liner 8 preferably has excellent air impermeable property, and preferably is made of butyl based rubber containing a halogenated butyl rubber at least 50 parts by weight in the rubber, for example.

Figure 2:
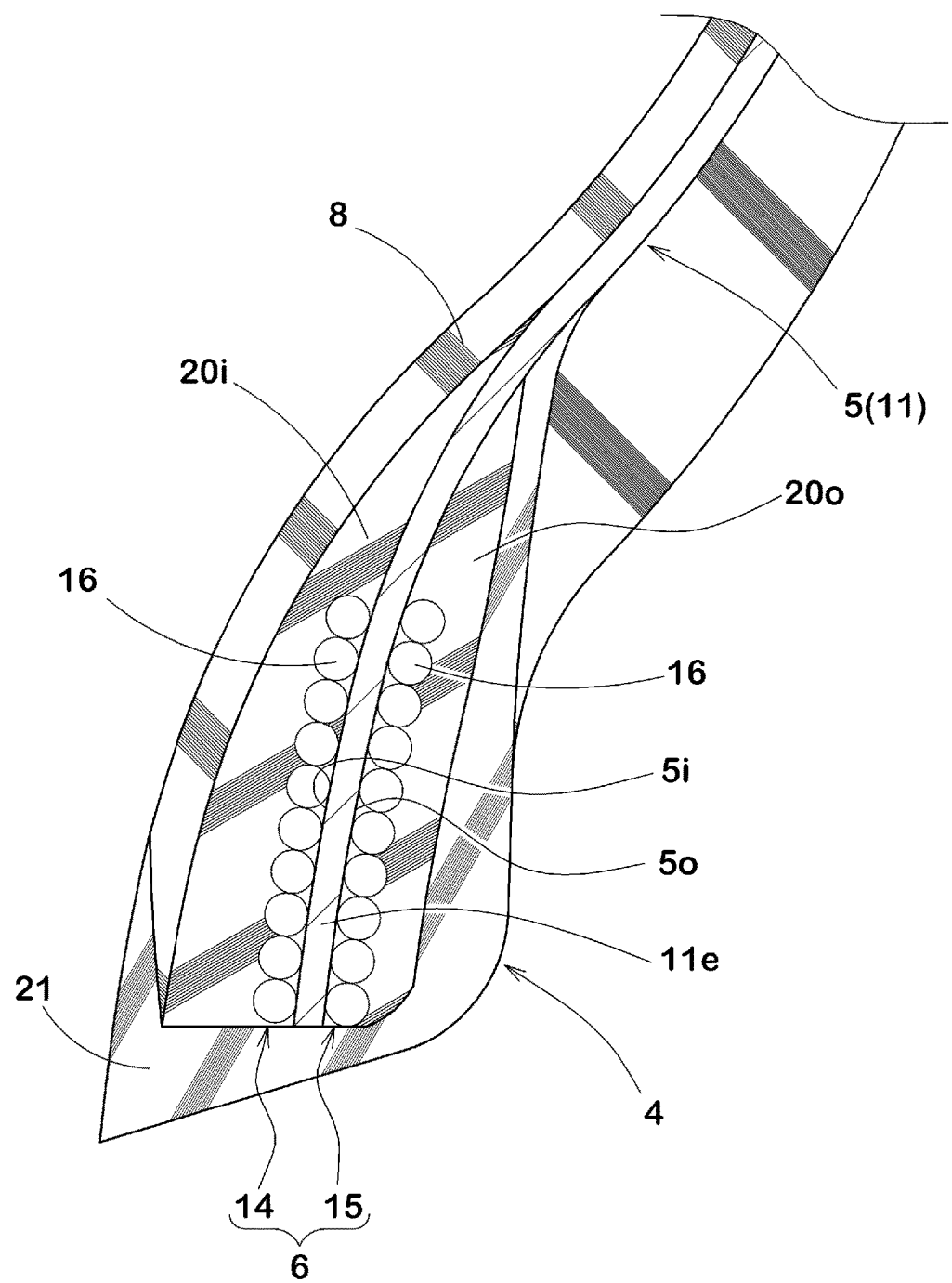
FIG. 2 is an enlarged view of a bead portion of FIG. 1.

FIG. 2 illustrates an enlarged view of the bead portion 4 of FIG. 1. The carcass 5 in accordance with the present embodiment is configured to at least one carcass ply 11 that includes an organic fiber carcass cord laid at an angle of from 70 to 90 degrees with respect to the circumferential direction of the tire. As shown in FIGS. 1 and 2, the carcass ply 11 extends between the bead portions 4 and 4 in a toroidal shape. The radially inner end 11e of the carcass ply 11 terminates within each bead core 6 without turning up around the bead core 6.

The bead core 6 includes an inner core 14 disposed along an axially inner surface 5i of the carcass ply 11 and an outer core 15 disposed along an axially outer surface 5o of the carcass ply 11. The inner core 14 and the outer core 15 hold the end portion lie of the carcass ply 11 from both sides to prevent pull-out of the carcass 5. The bead portion 4 is provided with a pair of bead apex rubber components 20i and 20o each made of a hard rubber to reinforce the bead portion 4. Furthermore, the bead portion 4 is arranged a chafer rubber 21 that suppresses not only damage caused by friction with a rim but also slippage to the rim.

Figure 3:
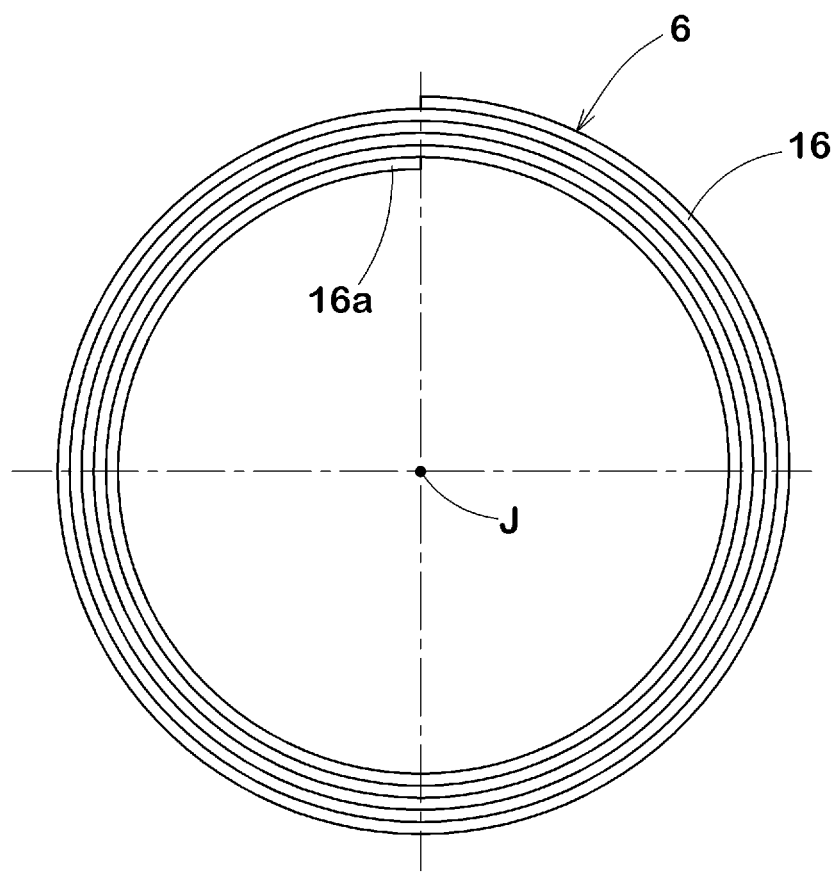
FIG. 3 is a side view of a bead core.

FIG. 3 illustrates a side view of the bead core 6. As shown in FIGS. 1 to 3, the bead core 6, which means the respective inner core 14 and the outer core 15, includes a bead cord 16 that is wound in the circumferential direction of the tire at least one time. In this embodiment, each of the inner core 14 and the outer core 15 is configured by winding the bead cord 16 around the tire central axis J such that the bead cord 16 is stacked in a radial direction of the tire in a swirl shape. The radially inner end 16a of the bead cord 16 is fixed by the bead cord which is wound thereon so as to overlap.

As shown in FIG. 2, each of the inner cores 14 and the outer core 15 in accordance with the present embodiment is configured as a single row in the axial direction of the tire. The inner core 14 and/or the outer core 15 may be configured as two or more rows in the axial direction of the tire in order to enhance rigidity of the bead portion.

Figure 4A:
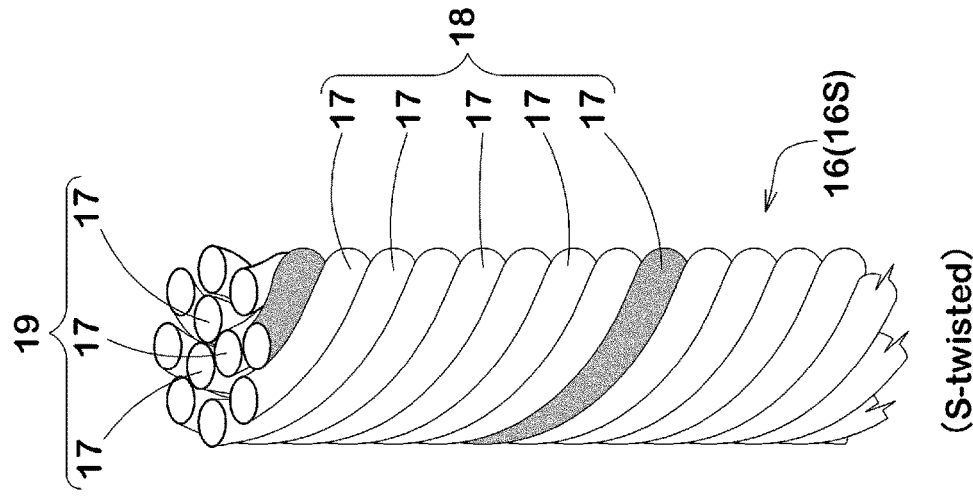
FIG. 4(A) is a perspective view of a Z-twisted bead cord.
Figure 4B:
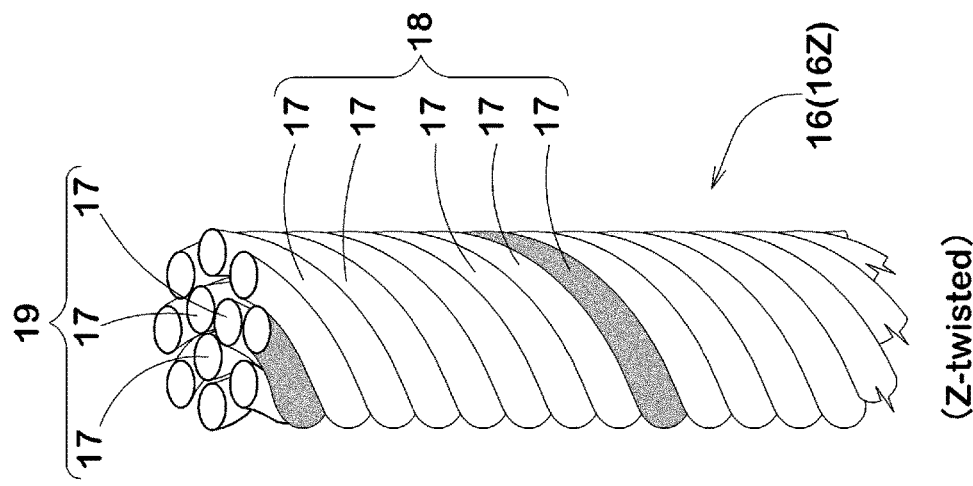
FIG. 4(B) is a perspective view of a S-twisted bead cord.

As shown in FIGS. 4A and 4B, the bead cord 16 includes an outermost layer 18 having a plurality of filaments 17 twisted together. The bead cord 16 in accordance with the present embodiment has a twisted structure that includes a core 19 including at least one filament 17 and the outermost layer 18 arranged outside the core 19.

The core 19 in accordance with the present embodiment is configured by twisting three filaments 17. The outermost layer 18 in accordance with the present embodiment is configured by twisting eight filaments 17. Preferably, each of the filaments 17 is made of steel, for example, to obtain a high strength.

If the twisting direction of the filaments 17 of the outermost layer 18 is recognized, as for the bead cord 16, various kinds of cords may be employed such as a bundle-twisted cord having a structure in which n pieces of filaments 17 are bundled and twisted together (1×n), a cord having a structure with the core 19 and the outermost layer 18 both of which have the same twisting pitch and direction of filaments, and a multi twisted cord having a structure in which m pieces of strands, each of which comprises n pieces of filaments twisted together, are twisted together (m×n), for example.

FIG. 4A illustrates a Z-twisted bead cord 16Z having the outermost layer 18 being twisted in the Z direction. The twisting direction "Z" means that directions of individual filaments appear on the outermost layer IS of the bead cords 16 as the diagonal extending from the upper right side to the lower left side in the letter "Z". FIG. 4B illustrates a S-twisted bead cord 16S having the outermost layer 18 being twisted in the S direction. The twisting direction "S" means that directions of individual filaments appear on the outermost layer 18 of the bead cords 16 as the diagonal extending from the upper left side to the lower right side in the letter "S".

When an external force that twists up the filaments acts on the bead cord 16, the filaments 17 of the outermost layer 18 may hardly deform. On the other hand, when an external force that loosens the twist of the filaments acts on the bead cord 16, the filaments 17 of the outermost layer 18 may easily deform (untwist). Furthermore, since the radially inner end 16a of the bead cord 16 is fixed, the deformation of the filaments 17 of the outermost layer 18 of the bead cord 16 tends to occur in a radially outer portion of the bead cord 16.

Figure 5:
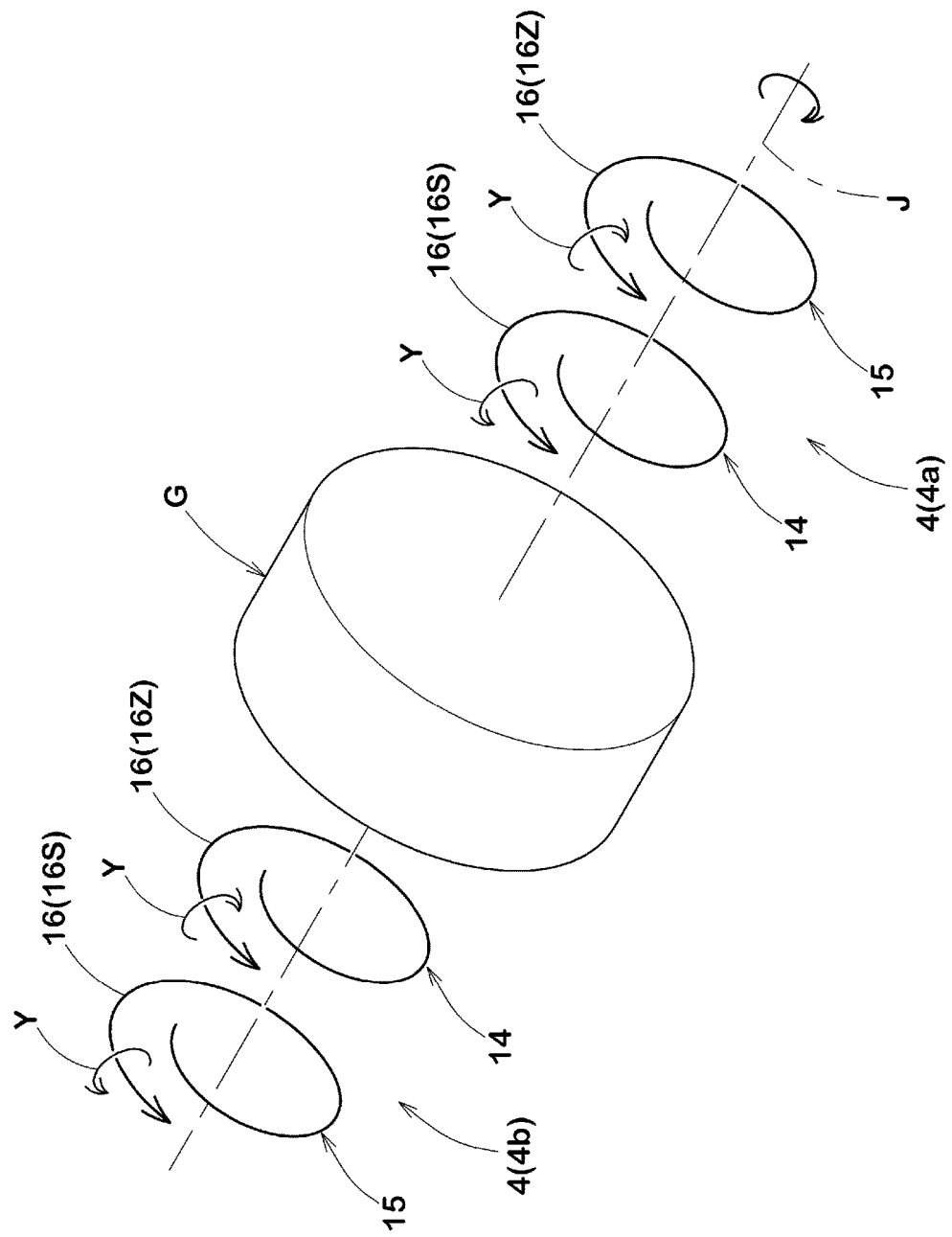
FIG. 5 is a schematic view of an inner core and an outer core.

FIG. 5 illustrates a schematic view of the inner core 14 and the outer core 15 which are incorporated in the pneumatic tire 1. The symbol "G" represents a core for tire molding. As shown in FIG. 5, in at least one of the bead portions 4, each of the outermost layers 18 of the bead cords 16 of the respective inner and outer cores 14 and 15 has a twisting direction in which the carcass ply 11 moves easily radially outwardly from between the inner core 14 and the outer core 15. In other words, when the carcass ply 11 moves radially outwardly, untwisting Y occurs on each outermost layer of the bead cords 16 of the respective inner core 14 and the outer core 15 so that the carcass ply 11 moves easily radially outwardly.

When the carcass cord 10, for example, thermally shrinks, the carcass ply 11 may move radially outwardly from between the inner core 14 and the outer core 15. Accordingly, an excessive increase in tension on the carcass cord 10 may be prevented. This may prevent the carcass cord 10 from biting into the inner liner 8, thereby improving durability of the tire 1.

Preferably, the inner core 14 is configured to have a symmetrical structure, to the outer core 15. Accordingly, the inner core 14 and the outer core 15 may equally hold the carcass ply 11.

In this embodiment, in each of the bead portions 4, the inner core 14 and the outer core 15 have the same winding direction of the bead cord 16 in the circumferential direction of the tire. Furthermore, in each of the bead portions 4, the twisting direction of the outermost layer 18 of the bead cord 16 of the inner core 14 is opposite to the twisting direction of the outermost layer 18 of the bead cord 16 of the outer core 15.

In the embodiment of FIG. 5 the core G is rotated clockwise around the tire axis J when viewed from the side of a first bead portion 4a (a front side bead of FIG. 5). Thus, the bead cords 16 of the respective inner and outer cores 14 and 15 which are wound in a swirl shape thereon will be wound counterclockwise in the circumferential direction. In this embodiment, the first bead portion 4a comprises the inner core 14 formed of the S-twisted bead cord 16S and the outer core 15 formed of the Z-twisted bead cord 16Z.

Figure 6:
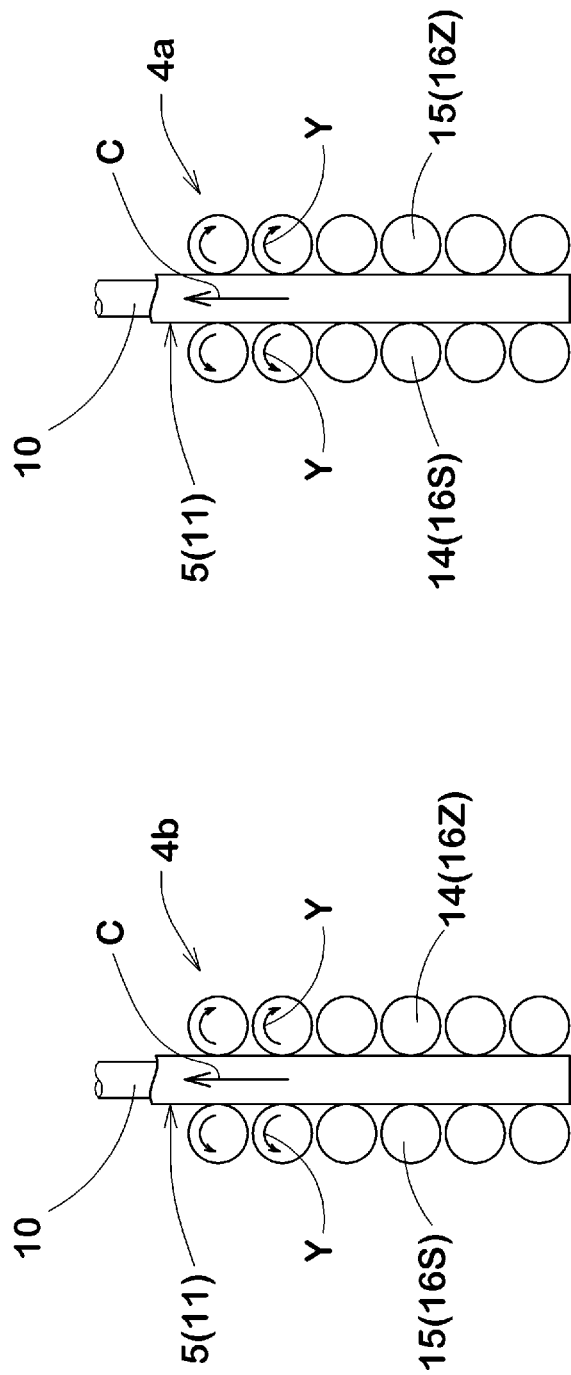
FIG. 6 is a meridian cross-sectional view of the respective bead portions.

FIG. 6 illustrates cross sectional views of the respective first bead portion 4a and the second bead portion 4b. When the carcass ply 11 is forced to move radially outwardly, untwisting Y occurs to the respective outermost layers 18 of the bead cords 16 of the inner core 14 and the outer core 15 in the respective bead portions 4a and 4b. Thus, the carcass ply 11 may move radially outwardly as shown the arrow A so as to reduce the tension on the carcass cord 10.

When the carcass cord 10 has a small heat shrinkage ratio, the tension on the carcass cord 10 does not excessively increase and therefore the amount of biting into the inner liner 8 of the carcass cord 10 is small. Accordingly, the effects of the present embodiment described above may effectively be obtained by applying to a tire having the carcass cord 10 with a heat shrinkage ratio of not less than 1.5%, more preferably not less than 2.0%. For example, such a carcass cord 10 is made of relatively inexpensive material such as PET, nylon or the like, and it helps to improve productivity in cost.

Here, the heat shrinkage ratio is defined as a ratio y/x (%) of the amount of shrinkage "y" of the carcass cord under a no-load condition when left 5 minutes at 180 degrees Celsius to an original length "x" of the carcass cord.

In another variation of the embodiment shown in FIG. 5, the core G may be rotated counterclockwise around the tire axis J. In this case, the bead cords 16 of the respective inner and outer cores 14 and 15, which are wound in a swirl shape thereon, will be wound clockwise in the circumferential direction. In this embodiment, the respective inner and outer cores 14 and 15 of the bead portions 4 are employed the bead cords 16 having an opposite twisting direction to the bead cords 16 shown in FIG. 5. In the embodiments of FIG. 5 and the variation thereof, since the bead cords 16 of the inner core 14 and the outer core 15 are wound in the same direction in a swirl shape, the green tire 1 may be molded easily.

Figure 7A:
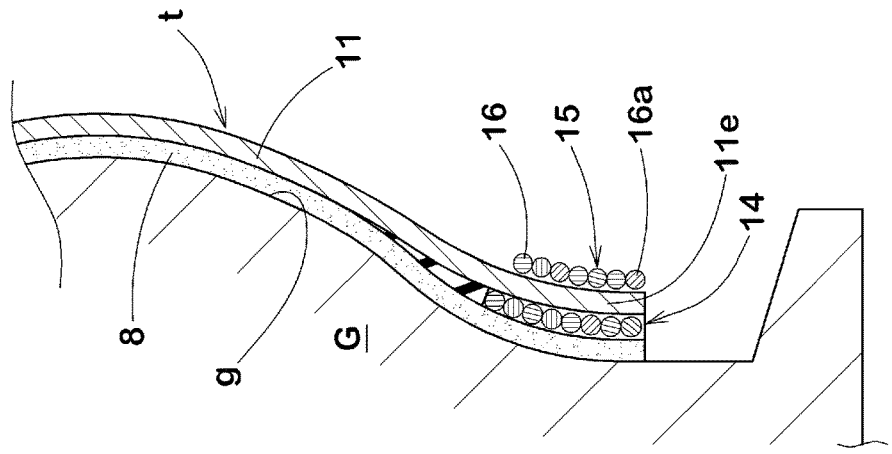
FIG. 7(A) is a explanatory view of a method for forming the inner core.
Figure 7B:
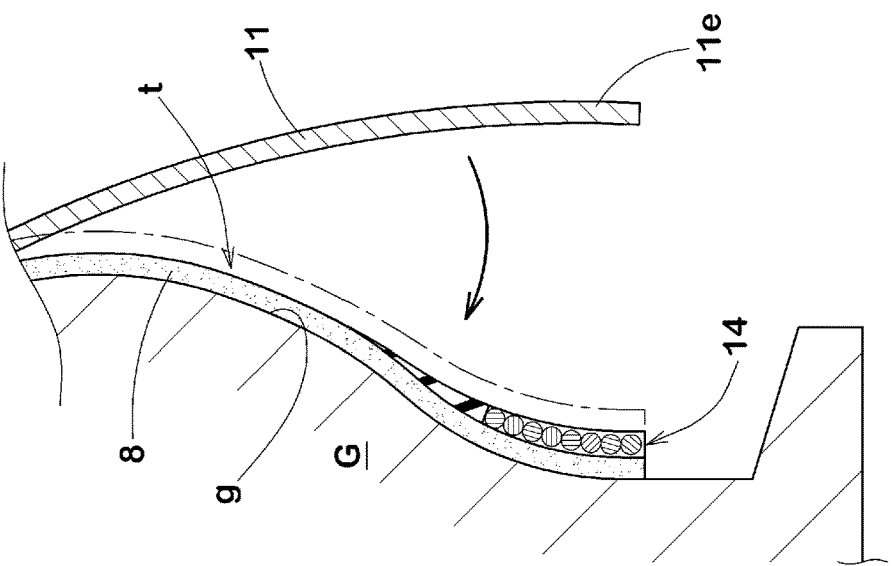
FIG. 7(B) is a explanatory view of a method for forming a carcass.
Figure 7C:
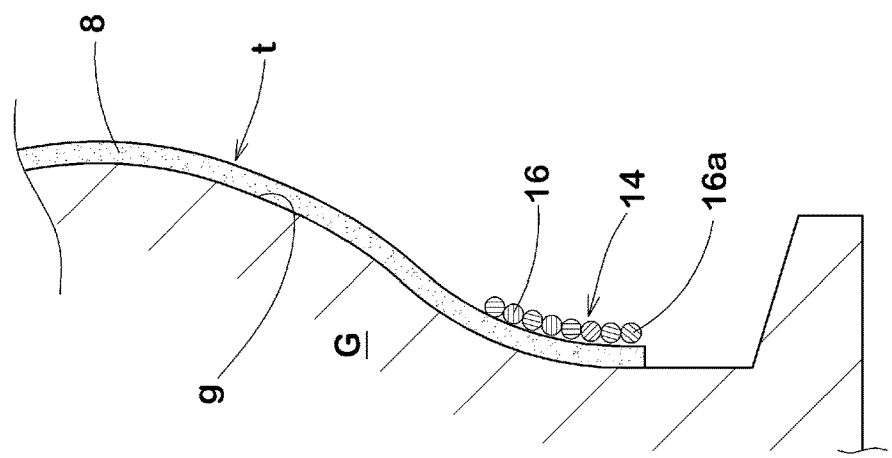
FIG. 7(C) is a explanatory view of a method for forming the outer core.

In FIGS. 7A to 7C, a method for manufacturing such a pneumatic tire 1 as described above will be explained. The pneumatic tire 1 will be manufactured through a green tire molding step and a vulcanization step. In the green tire molding step, a green tire t is molded by putting a plurality of unvulcanized tire components on the outer surface g of the core G successively. In the vulcanization step, the green tire t with the core G is vulcanized in a vulcanization mold.

The green tire molding step further includes an inner core forming step S1, a carcass forming step S2 and an outer core forming step S3.

As shown in FIG. 7A, in the inner core forming step S1, the inner core 14 is formed on the outer surface g of the core G by winding up the bead cord 16 coated by unvulcanized rubber in a swirl shape around the tire axis J from the radially inside to the outside of the tire. The radially inner end 16a of the bead cord 16 will be fixed by the bead cord 16 which is laid thereon in the radial direction of the tire.

As shown in FIG. 7B, in the carcass forming step S2, the carcass ply 11 is arranged so that the radially inner end portion 11e thereof is put on the axially outer surface of the inner core 14.

As shown in FIG. 7C, in the outer core forming step S3, the outer core 15 is formed on the axially outer surface of the inner end portion 11e of the carcass ply 11 by winding up the bead cord 16 coated by un vulcanized rubber in a swirl shape around the tire axis J from the radially inside to the outside of the tire. The radially inner end 16a of the bead cord 16 will be fixed by the bead cord 16 which is laid thereon in the radial direction of the tire.

In the inner core forming step S1 and the outer core forming step S3, the embodiment shown in FIG. 5 includes the first bead portion 4a (the front side in FIG. 5) which employs the S-twisted bead cord 16S as the inner core 14. The one end of the S-twisted bead cord 16S is fixed on the side of the core G. In the first bead portion 4a, the S-twisted bead cord 16S will be wound counterclockwise in the circumferential direction of the tire by rotating the core G clockwise around the tire axis. The first bead portion 4a includes the outer core 15 which employs the Z-twisted bead cord 16Z. The one end of the Z-twisted bead cord 16S is fixed on the side of the core. The Z-twisted bead cord 16Z will also be wound counterclockwise in the circumferential direction of the tire by rotating the core G clockwise around the tire axis. Furthermore, in the second bead portion 4b (the rear side in FIG. 5), both of the Z-twisted bead cord 16Z of the inner core 14 and the S-twisted bead cord 16S of the outer core 15 are wound counterclockwise.

Figure 8:
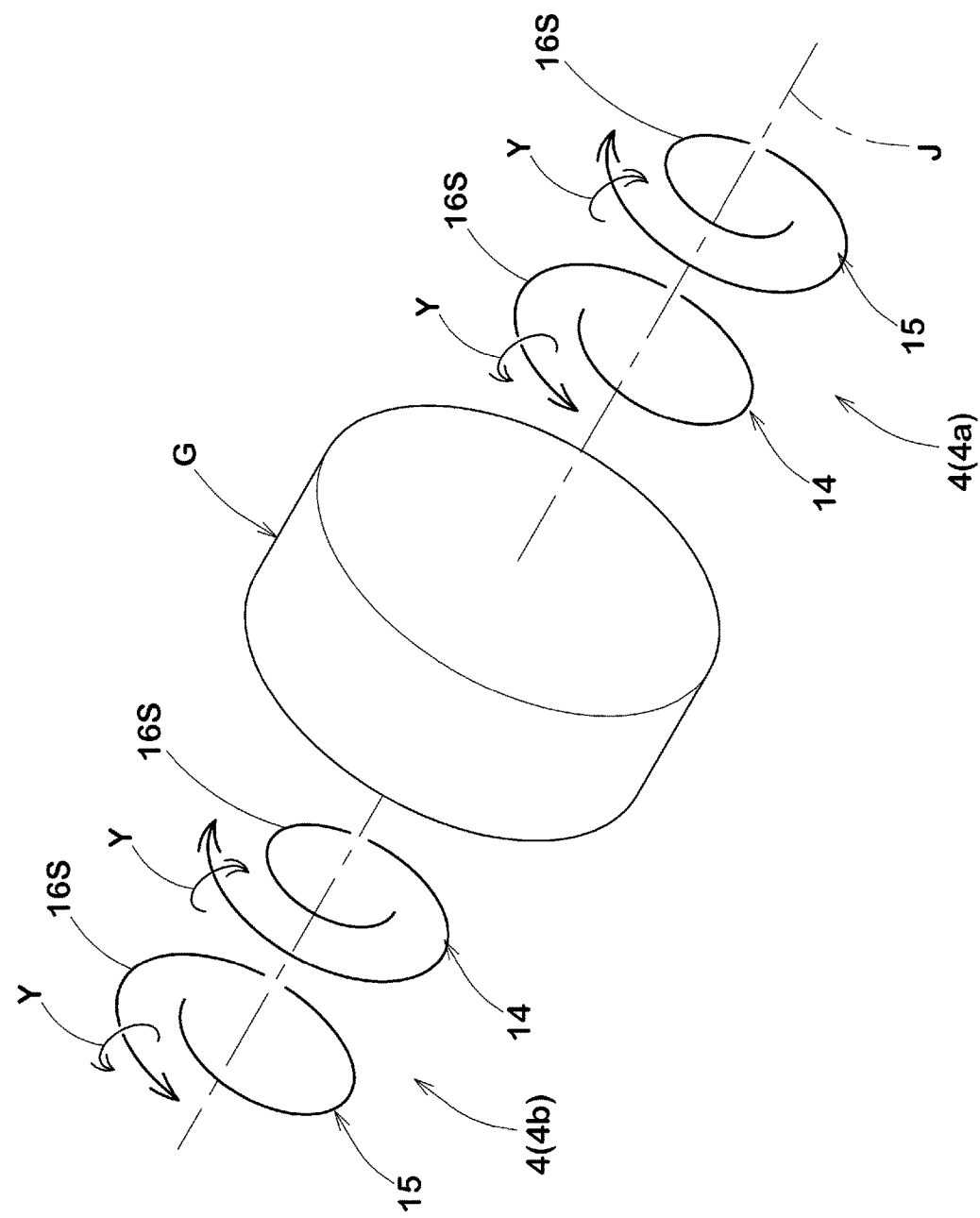
FIG. 8 is a schematic view of the inner core and the outer core in accordance with another embodiment of the invention.
Figure 9:
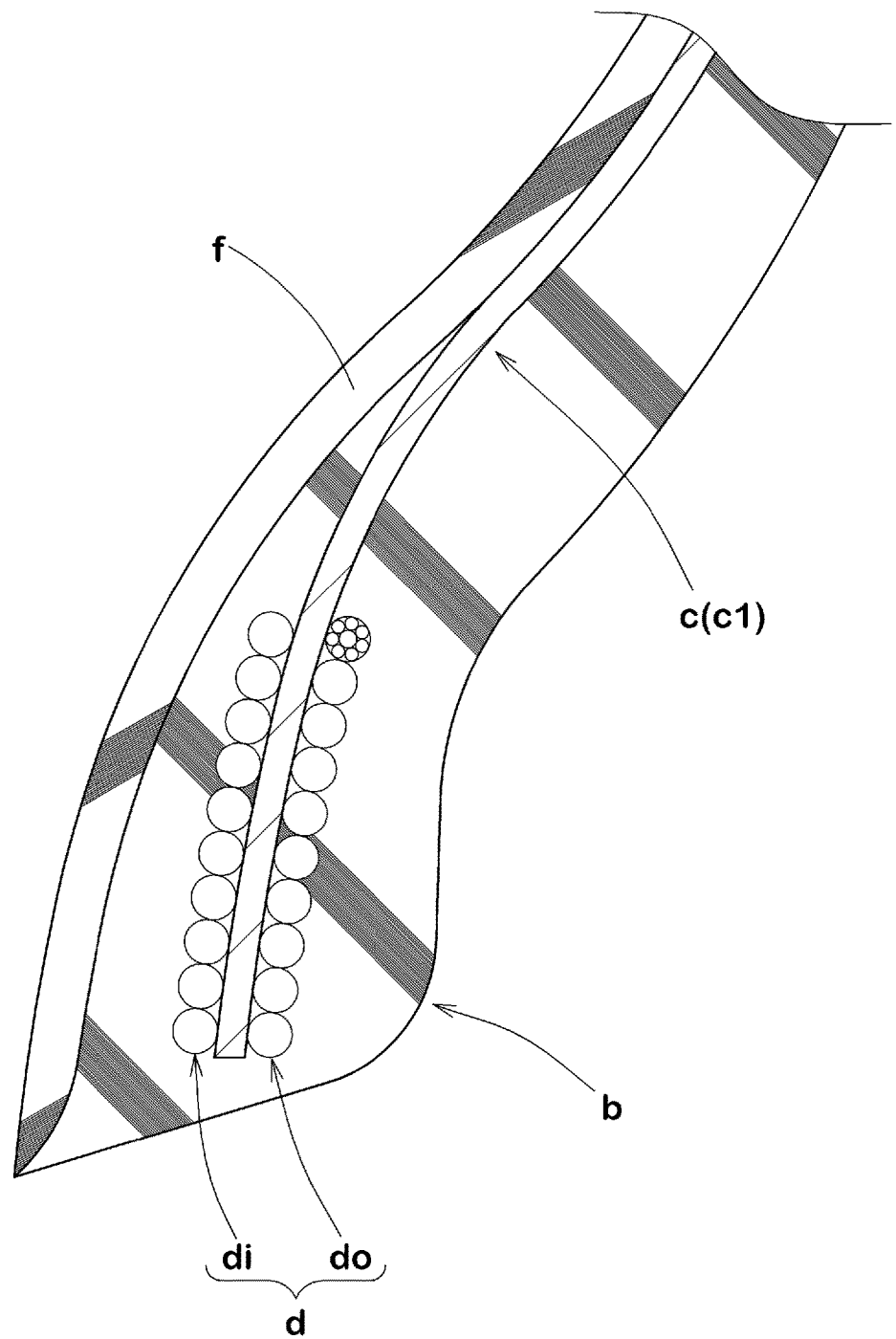
FIG. 9 is a cross-sectional view of a bead portion of a conventional pneumatic tire.

FIG. 8 illustrates the inner core 14 and the outer core 15 with the core G in accordance with another embodiment of the present invention. As shown in FIG. 8, in each of the bead portions 4a and 4b, the inner core 14 and the outer core 15 employ the bead cords 16 each having the outermost layer 18 with the same twisting direction one another. In this embodiment, the inner core 14 and the outer core 15 employ the S-twisted bead cord 16S. Furthermore, the winding direction of the bead cord 16 of the inner core 14 in the circumferential direction of the tire is opposite to the circumferentially winding direction of the bead cord 16 of the outer core 16 in the circumferential direction of the tire.

More specifically, the inner core 14 and the outer core 15 of the respective bead portions 4a and 4b employ the S-twisted bead cord 16S. In the first bead portion 4a (the front side in FIG. 8), the inner core 14 is wound counterclockwise in a swirl shape, and the outer core 15 is wound clockwise in a swirl shape. In the second bead portion 4b (the rear side in FIG. 8), the inner core 14 is wound clockwise in a swirl shape, and the outer core 15 is wound counterclockwise in a swirl shape. This configuration may provide untwisting Y of the bead cord so as to prevent the carcass cord from biting into the inner liner 8 and therefore may improve durability of the tire 1, as the embodiment mentioned above.

In variation of the embodiment shown in FIG. 8, the inner core 14 and the outer core 15 of the respective bead portions 4a and 4b may employ the Z-twisted bead cord 16Z. In this embodiment, each of the inner core 14 and the outer core 15 of the respective bead portions 4a and 4b is wound in an opposite direction to a direction thereof shown in FIG. 8.

Embodiments shown in FIG. 8 and its another variation, the inner core 14 and the outer core 15 are configured to use only one kind of the S-twisted bead cord 16S or the Z-twisted bead cord 16Z. Thus, the inner core 14 and the outer core 15 may improve productivity of the bead cord 16.

While the particularly preferable embodiments in accordance with the present invention have been described in detail, the present invention is not limited to the illustrated embodiments, but can be modified and carried out in various aspects.

In order to confirm effects of the invention, pneumatic tires (225/40R18) having an internal structure as shown in FIG. 1 were manufactured through the core molding method. The bead structure of each tire is as shown in Table 1. In each tire, the amount of biting of the carcass cord into the inner liner and durability were tested. The structure of the first and second bead portions of each tire is as shown in Table 1.

The respective bead cords shown in Table 1 have the same structure with respect to a twisting structure of 2/7×0.37, a cord diameter of 1.41 mm and twisting pitches of 50 mm, except a twisting direction. As the carcass cord, the "PET" is 1670/2 dtex, the "Rayon" is 1840/2 dtex, and the "Aramid" is 1100/2 dtex.

<Amount of Biting of Carcass Cord>

After vulcanizing each test tire, the amount of biting of the carcass cord into the inner liner was measured and evaluated using an index of its reciprocal, wherein Ex. 1 is set to 100. The larger the value, the better the performance is.

<Durability>

Each test tire was mounted on a wheel rim of 8.5 J with an internal pressure of 210 kPa, and then made to run on a dram tester at 80 km/hr until the tire was broken. Then runnable distance of each test tire was measured and evaluated using an index of the runnable distance of Ex. 1 being 100. The larger the value, the better the performance is.

TABLE 1

|  | Ref. 1 | Ref. 2 | Ref. 3 | Ref. 4 | Ref. 5 | Ex. 1 | Ex. 2 | Ex. 3 | Ex. 4 | Ex. 5 | Ex. 6 |
| --- | --- | --- | --- | --- | --- | --- | --- | --- | --- | --- | --- |
| Carcass cord material | PET | PET | PET | Rayon | Aramid | PET | PET | Nylon | Rayon | Aramid | PET |
| Heat shrinkage ratio (%) | 4.0 | 4.0 | 2.0 | 1.5 | 0 | 4.0 | 2.0 | 5.0 | 1.5 | 0 | 4.0 |
| Inner core of first bead portion |  |  |  |  |  |  |  |  |  |  |  |
| Winding direction of bead cord |  | Counterclockwise | | | | | Counterclockwise | | | | Clockwise |
| Twisting direction of outermost layer | S | Z | S | S | S | S | S | S | S | S | Z |
| Outer core of first bead portion |  |  |  |  |  |  |  |  |  |  |  |
| Winding direction of bead cord |  | Counterclockwise | | | | | Counterclockwise | | | | Clockwise |
| Twisting direction of outermost layer | S | Z | S | S | S | Z | Z | Z | Z | Z | S |
| Inner core of second bead portion |  |  |  |  |  |  |  |  |  |  |  |
| Winding direction of bead cord |  | Counterclockwise | | | | | Counterclockwise | | | | Clockwise |
| Twisting direction of outermost layer | S | Z | S | S | S | Z | Z | Z | Z | Z | S |
| Outer core of second bead portion. |  |  |  |  |  |  |  |  |  |  |  |
| Winding direction of bead cord |  | Counterclockwise | | | | | Counterclockwise | | | | Clockwise |
| Twisting direction of outermost layer | S | Z | S | S | S | S | S | S | S | S | Z |
| Amount of biting (Score from 0 to 10) | 2.0 | 2.0 | 4.0 | 7.0 | 10.0 | 8.0 | 8.5 | 7.5 | 9.0 | 10.0 | 8.0 |
| Durability (Score from 0 to 10) | 1.0 | 1.0 | 4.0 | 8.5 | 10.0 | 9.0 | 9.0 | 8.5 | 9.5 | 10.0 | 9.0 |

|  | Ref. 6 | Ref. 7 | Ref. 8 | Ref. 9 | Ref. 10 | Ex. 7 | Ex. 8 | Ex. 9 | Ex. 10 | Ex. 11 | Ex. 12 |
| --- | --- | --- | --- | --- | --- | --- | --- | --- | --- | --- | --- |
| Carcass cord material | PET | PET | Nylon | Rayon | Aramid | PET | PET | Nylon | Rayon | Aramid | PET |
| Heat shrinkage ratio (%) | 4.0 | 2.0 | 5.0 | 1.5 | 0 | 4.0 | 2.0 | 5.0 | 1.5 | 0 | 4.0 |
| Inner core of first bead portion |  |  |  |  |  |  |  |  |  |  |  |
| Winding direction of bead cord |  | Counterclockwise | | | | | Counterclockwise | | | | Clockwise |
| Twisting direction of outermost layer | Z | Z | Z | Z | Z | S | S | S | S | S | Z |
| Outer core of first bead portion |  |  |  |  |  |  |  |  |  |  |  |
| Winding direction of bead cord |  | Counterclockwise | | | | | Clockwise | | | | Counter-clockwise |
| Twisting direction of outermost layer | S | S | S | S | S | S | S | S | S | S | Z |
| Inner core of second bead portion |  |  |  |  |  |  |  |  |  |  |  |
| Winding direction of bead cord |  | Counterclockwise | | | | | Clockwise | | | | Counter-clockwise |
| Twisting direction of outermost layer | Z | Z | Z | Z | Z | S | S | S | S | S | Z |
| Outer core of second bead portion |  |  |  |  |  |  |  |  |  |  |  |
| Winding direction of bead cord |  | Counterclockwise | | | | | Counterclockwise | | | | Clockwise |
| Twisting direction of outermost layer | S | S | S | S | S | S | S | S | S | S | Z |
| Amount of biting (Score from 0 to 10) | 1.0 | 3.0 | 1.0 | 6.0 | 10.0 | 8.0 | 8.5 | 7.5 | 9.0 | 10.0 | 8.0 |
| Durability (Score from 0 to 10) | 1.0 | 2.0 | 1.0 | 6.0 | 10.0 | 9.0 | 9.0 | 8.5 | 9.5 | 10.0 | 9.0 |

As shown in Table 1, it is confirmed that example tires prevent the carcass cord from biting into the inner liner and improve durability.

REFERENCE SIGNS LIST

1 Pneumatic tire
4 Bead portion
5 Carcass
6 Bead core
8 Inner liner
11 Carcass ply
14 Inner core
15 Outer core
16 Bead cord
18 Outermost layer

The invention claimed is:

1. A pneumatic tire comprising:
a carcass comprising a carcass ply extending between bead cores of bead portions through a tread portion and a pair of sidewall portions;
the carcass ply comprising a carcass cord having a heat shrinkage ratio of not less than 2.0%, where the heat shrinkage ratio is defined as a ratio y/x (%) of an amount of shrinkage "y" of the carcass cord under a no-load condition when left 5 minutes at 180 degrees Celsius to an original length "x" of the carcass cord;
each of the bead cores comprising an inner core disposed adjacently in contact with and axially inward of the carcass ply and an outer core disposed adjacently in contact with and axially outward of the carcass ply, wherein the carcass ply is interposed between the inner core and the outer core;
each of the outer core and the inner core consisting of a bead cord being wound a plurality of times in a circumferential direction of the tire in a spiral manner so as to overlie in a tire radial direction; and
the bead cord comprising an outermost layer having a plurality of filaments twisted together,
wherein, in one of the bead portions, when viewed in the tire axial direction from the one of the bead portions toward the other one of the bead portions, a winding direction of the bead cord from a radially inner end to a radially outer end thereof of each of the inner core and the outer core in the tire circumferential direction is counterclockwise,
the twisting direction of the outermost layer of the bead cord of the inner core is S-twist, and
the twisting direction of the outermost layer of the bead cord of the outer core is Z-twist.

2. The pneumatic tire according to claim 1,
wherein, in the other one of the bead portions, when viewed in the tire axial direction from the one of the bead portions toward the other one of the bead portions, the winding direction of the bead cords of the inner core and the outer core in the tire circumferential direction is counterclockwise,
the twisting direction of the outermost layer of the bead cord of the inner core is S-twist, and
the twisting direction of the outermost layer of the bead cord of the outer core is Z-twist.

3. A pneumatic tire comprising:
a carcass comprising a carcass ply extending between bead cores of bead portions through a tread portion and a pair of sidewall portions;
the carcass ply comprising a carcass cord having a heat shrinkage ratio of not less than 2.0%, where the heat shrinkage ratio is defined as a ratio y/x (%) of an amount of shrinkage "y" of the carcass cord under a no-load condition when left 5 minutes at 180 degrees Celsius to an original length "x" of the carcass cord;
each of the bead cores comprising an inner core disposed adjacently in contact with and axially inward of the carcass ply and an outer core disposed adjacently in contact with and axially outward of the carcass ply, wherein the carcass ply is interposed between the inner core and the outer core;
each of the outer core and the inner core consisting of a bead cord being wound a plurality of times in a circumferential direction of the tire in a spiral manner so as to overlie in a tire radial direction; and
the bead cord comprising an outermost layer having a plurality of filaments twisted together,
wherein, in one of the bead portions, when viewed in the tire axial direction from the one of the bead portions toward the other one of the bead portions, a winding direction of the bead cord from a radially inner end to a radially outer end thereof of each of the inner core and the outer core in the tire circumferential direction is clockwise,
the twisting direction of the outermost layer of the bead cord of the inner core is Z-twist, and
the twisting direction of the outermost layer of the bead cord of the outer core is S-twist.

4. The pneumatic tire according to claim 3,
wherein, in the other one of the bead portions, when viewed in the tire axial direction from the one of the bead portions toward the other one of the bead portions, the winding direction of the bead cords of the inner core and the outer core in the tire circumferential direction is clockwise,
the twisting direction of the outermost layer of the bead cord of the inner core is Z-twist, and
the twisting direction of the outermost layer of the bead cord of the outer core is S-twist.

5. A pneumatic tire comprising:
a carcass comprising a carcass ply extending between bead cores of bead portions through a tread portion and a pair of sidewall portions;
the carcass ply comprising a carcass cord having a heat shrinkage ratio of not less than 2.0%, where the heat shrinkage ratio is defined as a ratio y/x (%) of an amount of shrinkage "y" of the carcass cord under a no-load condition when left 5 minutes at 180 degrees Celsius to an original length "x" of the carcass cord;
each of the bead cores comprising an inner core disposed adjacently in contact with and axially inward of the carcass ply and an outer core disposed adjacently in contact with and axially outward of the carcass ply, wherein the carcass ply is interposed between the inner core and the outer core;
each of the outer core and the inner core consisting of a bead cord being wound a plurality of times in a circumferential direction of the tire in a spiral manner so as to overlie in a tire radial direction; and
the bead cord comprising an outermost layer having a plurality of filaments twisted together,
wherein, in at least one of the bead portions, a winding direction of the bead cord from a radially inner end to a radially outer end thereof of the inner core in the circumferential direction of the tire is opposite to the winding direction of the bead cord of the outer core in the circumferential direction of the tire, and the twisting direction of the outermost layer of the bead cord of the inner core is the same as the twisting direction of the outermost layer of the bead cord of the outer core.

* * * * *